Nov. 25, 1941.        A. D. NASH        2,264,183

ORNAMENTAL TILE AND PROCESS OF MANUFACTURE THEREOF

Filed Nov. 1, 1938

INVENTOR.
ARTHUR D. NASH
BY Bradley & Bee
ATTORNEYS.

Patented Nov. 25, 1941

2,264,183

UNITED STATES PATENT OFFICE 2,264,183

ORNAMENTAL TILE AND PROCESS OF MANUFACTURE THEREOF

Arthur D. Nash, Sewickley, Pa., assignor to Pittsburgh Plate Glass Company, Allegheny County, Pa., a corporation of Pennsylvania Application November 1, 1938, Serial No. 238,223

1 Claim. (Cl. 49—82)

The present invention relates to structural tile and more particularly to glass tile in which special decorative effects are made a permanent part thereof.

The primary object of the invention is the provision of an ornamental glass tile and decorative surface of which is protected against deterioration.

Other objects and advantages of the invention will become more apparent from the following detailed description of certain preferred embodiments thereof.

Glass has long been used as a basic material from which tiles or other structural units have been produced. The numerous advantages of glass, such as its decorative value, its susceptibility to wide variations in color, and its smooth surface to which dirt will not adhere, have been valuable features upon which designers and builders have sought to capitalize. As a modification of the ordinary glass tile of a solid color, attempts have been made to use a clear glass surfaced with a glaze or vitreous layer. Such glass products could be produced much more cheaply and, at the same time, a greater number of decorative schemes could be reduced to practical form. Variegated colors could be applied to the tile, special striations could be effected and innumerable color designs could be created.

Unfortunately it was soon discovered that the decorative glaze was subject to fairly rapid deterioration when exposed to the elements or even when installed in the interior of buildings. Research workers have been unable to develop a vitreous glaze or enamel which would overcome these defects. Accordingly, glazed tiles or glass have not met with great favor in the industry.

Briefly stated, the present invention contemplates the preparation of a glazed glass tile and the protection of its glazed surface by a second plate of glass. The completed tile is in the form of a laminated structure in which two plates of glass are bonded together by an intermediate layer of vitreous material.

Figure 1:
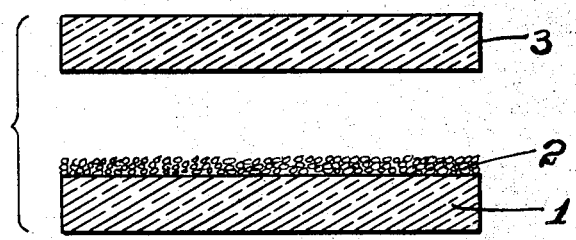
Figure 2:
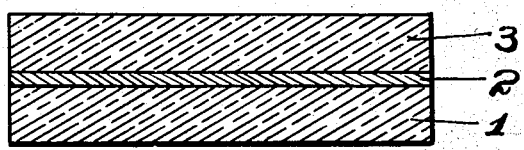

One embodiment of the invention is illustrated in the accompanying drawing, wherein:

Figure 1 is a vertical sectional view showing the elements of a tile in spaced unassembled relation; and Figure 2 is a vertical sectional view showing the tile after it has been assembled and heated.

Referring to the drawing, a sheet or plate 1 of clear glass is covered with a layer 2 of pulverulent vitreous material and a plate or sheet 3 of clear glass is superposed thereon. The assembled elements are then heated sufficiently to fuse the layer 2 of vitreous material into a uniform film which serves to bind or hold the glass plates 1 and 3 together. After the assembly has been subjected to the heat treatment, the resultant product is annealed or otherwise cooled slowly in order that the bond between the glass plates will be maintained.

The vitreous material forming the intermediate layer 2 may be pulverized glass or a powdered vitreous glaze of a single or a plurality of colors. It is preferable that the powdered vitreous material have a melting point substantially below the softening point of the glass forming the outer plates. Under these conditions, the glass plates may be united without undue softening and possible deterioration of the plane surfaces of the glass plates. In certain instances, the powdered vitreous material may be of a glass of similar basic composition as the outer sheets. Obviously, however, the fusion in such case must be accomplished by subjecting the entire assembly to a temperature in excess of the softening point of the base glass. Careful handling of the assembly during the heating operation will prevent undue distortion or warpage thereof. It should also be noted that there is a possibility of air bubbles being trapped between the glass plates during the manufacture of the tile. This tendency may be obviated in numerous ways, as for example by having one of the glass plates slightly bent so that the plates are spaced a distance greater at the edges than at the center. The bond between the plates will not be affected nor will the value of the tile be impaired.

The ornamental tile, as contemplated by my invention, may be manufactured in large units and subsequently cut into smaller sizes of regular or irregular shape, or if it is preferred, the glass plates 1 and 3 may be cut to the desired size and shape before being bonded together. Since the bond between the glass plates is of a vitreous nature, the resultant tile may be cut as readily as a single piece of glass and no special tools are necessary for this purpose.

It will at once be obvious that various modifications in the nature of the elements employed in the manufacture of the tile and their arrangement are possible without departing from the spirit of the invention or the scope of the appended claim.

What I claim is:

A process of manufacturing ornamental tile which comprises spreading over one surface of a glass plate a layer of pulverulent colored vitreous glaze which has a melting point substantially below the softening point of the glass plate, superposing a second plate of glass upon the layer of glaze, heating the assembly to a temperature sufficient only to fuse the vitreous glaze into a uniform film bonding the glass plates together, and annealing the resultant product.

ARTHUR D. NASH.